(12) United States Patent
Van De Sanden et al.

(10) Patent No.: US 8,829,390 B2
(45) Date of Patent: Sep. 9, 2014

(54) METHOD OF MANUFACTURING A BEARING COMPONENT

(75) Inventors: John Van De Sanden, Nieuwegein (NL); Hendrik Johannes Krock, Sleeuwijk (NL); Hendrik Anne Mol, Sleeuwijk (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/517,430

(22) PCT Filed: Dec. 22, 2009

(86) PCT No.: PCT/EP2009/009209
§ 371 (c)(1),
(2), (4) Date: Aug. 24, 2012

(87) PCT Pub. No.: WO2011/076229
PCT Pub. Date: Jun. 30, 2011

(65) Prior Publication Data
US 2012/0312783 A1    Dec. 13, 2012

(51) Int. Cl.
*B23K 26/00*  (2014.01)
*G07D 7/14*   (2006.01)
*F16C 33/64*  (2006.01)
*G06K 19/06*  (2006.01)
*B41M 5/26*   (2006.01)
*F16C 41/00*  (2006.01)
*G06K 1/12*   (2006.01)

(52) U.S. Cl.
CPC ............... *B41M 5/262* (2013.01); *G07D 7/14* (2013.01); *F16C 33/64* (2013.01); *G06K 19/06* (2013.01); *F16C 41/008* (2013.01); *G06K 1/126* (2013.01)
USPC ...................................... 219/121.68

(58) Field of Classification Search
USPC ...................... 219/121.68; 235/493
See application file for complete search history.

(56) References Cited

U.S. PATENT DOCUMENTS 4,335,295 A  *  6/1982  Fowler ................. 219/121.85
6,527,193 B1      3/2003  Beli et al.

FOREIGN PATENT DOCUMENTS

| JP | 2009090358 A | 4/2009 |
| WO | WO9905636 A1 | 2/1999 |
| WO | WO2007020257 A1 | 2/2007 |

\* cited by examiner

*Primary Examiner* — Dana Ross
*Assistant Examiner* — Renee L Miller
(74) *Attorney, Agent, or Firm* — Bryan Peckjian; SKF USA Inc. Patent Department

(57) ABSTRACT

The present invention relates to a method of manufacturing a bearing component, in which a visible identification mark is created on a surface of the component using a laser beam. The laser marking creates an oxidized layer on the component surface and, in an underlying region, alters the microstructure of the bearing steel from which the component is made. According to the invention, the mark is then rendered visually undetectable with the naked eye, by removing at least the oxidized surface layer of the mark. This exposes the altered microstructure, which is revealable by applying an etchant to the visually undetectable mark.

13 Claims, 1 Drawing Sheet

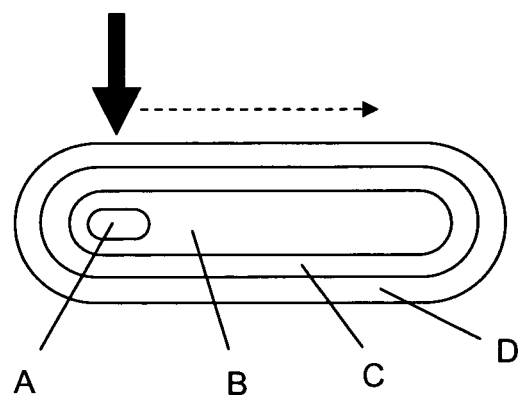
Fig. 1
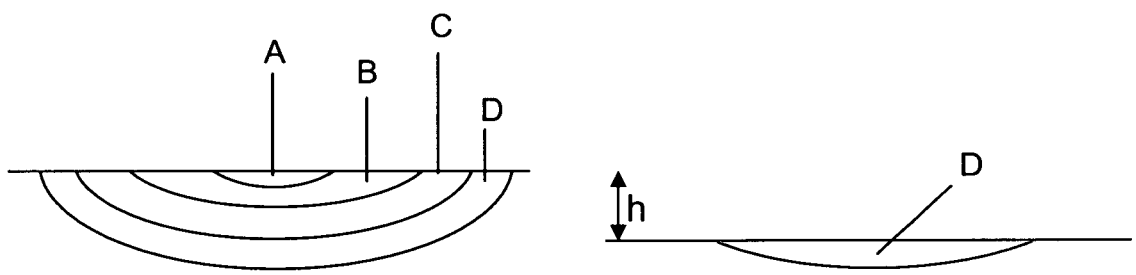
Fig. 2
Fig. 3
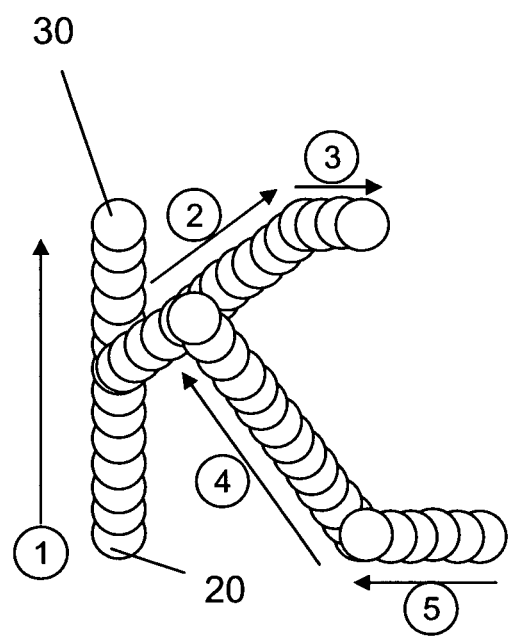
Fig. 4

METHOD OF MANUFACTURING A BEARING COMPONENT

CROSS-REFERENCE

This application is the U.S. national stage of International Application No. PCT/EP2009/009209 filed on Dec. 22, 2009.

TECHNICAL FIELD

The invention relates to a method of manufacturing a component made of hardened bearing steel, in which a surface of the component is provided with a visually undetectable identification mark.

BACKGROUND OF THE INVENTION

Laser marking is commonly used on bearing components, to provide the component with e.g. a type number. Laser marking for bearing steels is based on the changes that develop in the material due to the heating of the steel by the laser radiation. Various ways of laser marking may be distinguished. Some of them are described hereafter. Engraving is the removal of material to a depth of 10 to 50 µm. The laser is used to create a groove in the material and due to melting and evaporation, material may be removed to form the groove. Ablation is the evaporation of material by extremely fast laser pulses. The processed material evaporates and fumes are exhausted to prevent re-deposition. For metallic pieces ablation may be used, for example, for surface patterning or for drilling extremely fine holes. Tempering, also called annealing, is the main method for marking steel components. The heat of the laser tempers the steel which changes reflectivity and/or surface structure, leading to a visible mark.

WO2007/020257 discloses a method of marking a metallic object by local conversion of its metallic structure, for example by heating with a laser. This document describes that the conversion takes place through the thickness of the piece to be marked.

It is also known to create marks through the modification of the structure or internal stress within materials, for example by laser treatment. According to U.S. Pat. No. 6,527,193, this creates local deviations in the magnetic, acoustic or electric properties of the marked material, these deviations being hidden to the eye but readable with appropriate instruments.

SUMMARY OF THE INVENTION

According to a first aspect, the invention provides a method of manufacturing a bearing component that comprises creating with a laser a visible identification mark on a surface of the component. The laser marking creates an oxidised layer on the component surface and, in an underlying region, alters the microstructure of the bearing steel from which the component is made. According to the invention, the mark is then rendered visually undetectable with the naked eye, by removing at least the oxidised surface layer of the mark. This exposes the altered microstructure, which is revealable by applying an etchant to the visually undetectable mark, thereby allowing authentication of the component in a straightforward manner.

Rendering the mark visually undetectable with the naked eye means that the mark becomes indistinguishable from adjacent areas of the steel component; it becomes invisible, imperceptible to the eye. As a consequence, a possible counterfeiter may not be aware of a piracy protection on the piece he is trying to copy and therefore may manufacture an article without a hidden mark produced in accordance with the invention. Thus the counterfeit component will be easily distinguishable from a genuine article.

According to a second aspect, the invention relates to a bearing component provided with a visually undetectable identification mark, whereby the mark is created by laser marking a surface of the component then removing at least an oxidised surface of the laser mark.

According to a third aspect, the invention provides a method of authenticating a bearing component provided with a visually undetectable identification mark as described herinabove. The mark is revealed and becomes readable after an etchant is applied to the surface of the component where the identification mark is present. Etching is a very simple way of rendering the marking visible, and there is no need for a complex process in a laboratory or for instruments or machines.

Once revealed, the mark is easily read with the eye, possibly with a magnifying glass or an optical microscope. Suitably, the mark constitutes an identification code and corresponds to an identification code stored in a manufacturer's database. A revealed code can therefore be checked against the database to verify the authenticity of the bearing component.

In one embodiment, the code uniquely identifies the component. In another embodiment, the revealed code in combination with at least a second variable constitute a unique identifier of the component. The second variable may be, for example, the location of the hidden mark on the component, an article number or serial number of the component, a manufacturing date, a manufacturing site etc. In a still further embodiment, the revealed code is one of a set of identifiers that is linked to a particular manufacturing batch and/or manufacturing date and/or manufacturing site etc. The identification mark can be a character string, or can also be encrypted code such as a barcode.

In one preferred embodiment, the identification mark comprises encrypted information. Suitably, the step of laser marking then comprises using predetermined start and stop locations of the laser beam in order to form at least one symbol of the mark, which symbol comprises at least one continuous line. After etching, it is possible to determine from the revealed mark the locations where the continuous line started and stopped. Consequently, the encrypted information may comprise the start/stop locations of the at least one continuous line. When the mark comprises a plurality of symbols having at least one continuous line, the start/stop locations of each continuous line advantageously form part of the encrypted information. When the mark comprises one or more symbols having at least two intersecting continuous lines, the step of laser marking may suitably comprise using a predetermined sequence to form each continuous line. The sequence used is also discernable from the revealed mark, meaning that also the predetermined sequence may form part of the encrypted information. The encrypted information may be linked to a manufacturing site and/or manufacturing date etc., which information is then decrypted in order to identify or authenticate the bearing component in question. A variety of further alternatives are possible to authenticate the component and to render counterfeiting almost impossible.

Laser beam marking of a component made of bearing steel creates a visible mark on the surface of the component. Furthermore, the laser marking produces one or more heat affected zones in the underlying material. The microstructure of steel changes when it is heated, and several zones may be distinguishable, according to the temperatures they have reached. The heat affected zones created will be described, by way of example, in relation to a laser mark made on a surface of a bearing component that has undergone a hardening treatment.

At the centre of the mark, temperatures may have been high enough (for example, above 1500° C.) to melt the steel locally. This is called the melted zone, which after cooling of the bearing component, may become a re-hardened zone, comprising martensite. This is a very hard phase in which most of the alloy elements are dissolved. It is called herein zone A.

A hardened zone may be present directly outside the melted zone, which after cooling of the bearing component, may become a re-hardened zone called an over-austenitised zone. This zone was not melted but most of the alloy elements therein are dissolved. It may have undergone temperatures between 800 and 1500° C. It is called herein zone B.

After this latter zone, an intermediate zone may be present, called a re-austenitised zone which may comprise remaining carbides. It is called herein zone C. A portion of this zone may also be considered as a re-hardened region after cooling of the bearing component.

Finally, at the periphery of the mark, a tempered zone may be present comprising carbide precipitates. It is called herein zone D. In this zone, the temperature of the steel may have reached between 200 and 500° C.

In addition, an oxide layer with a thickness of a few microns forms at the surface heated by the laser. This layer generally appears dark due to the reflection of the light in all directions and the oxidised surface, and typically has a thickness of a few microns. After removal of the oxide layer by means of e.g. polishing, the different heat-affected zones created by a laser mark may be easily seen by exposing the mark to a suitable etchant, for example: a solution of nitric acid and ethanol (Nital). The etchant attacks the interfaces between the small precipitates and the steel matrix and attacks the different phases in the steel at different rates. When etched, zone A may become white, zone B white and grey and zone D dark.

The above described zones A-D are also revealed by etching when the laser marking is performed before the bearing component has undergone a hardening treatment.

The present invention preferably uses the property of zone D to become dark when etched, to create a mark that may be rendered visually detectable after etching. This may necessitate that tempered zone D is exposed, i.e. present at the surface of the bearing component, at the end of the bearing component manufacturing process.

A first embodiment of the method of manufacturing according to the invention will now be summarized in relation to a ring of a rolling element bearing. In general, a bearing ring is manufactured by forming a ring blank, soft machining the ring blank, hardening the ring, grinding or hard turning side faces of the bearing ring (known as face machining), hard machining a bore and raceway of the ring, honing the raceway, followed by washing. The finished ring is then laser-marked with e.g. the manufacturer's name and the product serial number, which markings are intended to remain visible.

In one example of the first embodiment, an identification mark according to the invention is provided on a side face of the bearing ring and the method comprises laser marking the ring prior to the step of face machining. During the step of face machining, 0.1 to 0.2 mm of material is typically removed. Suitably, the laser mark is configured to create the tempered zone at a depth of around 0.3 to 0.5 mm. To create a tempered zone at such a depth, i.e. to induce temperatures of around 200-500° C. at such a depth, the mark generally includes all the zones A to D described hereinabove.

Advantageously the mark has a depth of at least 0.2 mm, more preferably at least 0.3 mm or 0.4 mm; preferably the mark has a depth of less than 5 mm. By selecting depths which are not too large, the risk of deteriorating the bearing component's mechanical properties is reduced and/or avoided; selecting depths which are not too small ensures that the mark is still revealable and readable after a mechanical surface treatment like grinding. As will be understood, the minimum and maximum depths of the laser mark can differ depending on the amount of material that is removed during the face machining step and the size and thickness of the bearing ring.

When the component marked according to the present invention is a component of a rolling element bearing, the mark may be created on any non-rolling contact surface of the bearing; for example, on an end of a roller or on an outer circumference of the bearing outer ring. A mark is not provided on a raceway of the bearing, since the bearing raceway must satisfy strict hardness requirements in order to withstand rolling contact fatigue. Laser marking of a raceway surface would compromise hardness and is thus inadvisable. The method according to the present invention may also be used to manufacture a ring of a plain bearing or a component of a linear bearing.

Laser marking according to the present invention may be made with various laser types, e.g. solid state lasers (Nd:YAG lasers, fibre lasers) or $CO_2$ lasers. Lasers producing pulses of radiation or, alternatively, continuous wave lasers may be used. In preferred embodiments, at least one, or preferably more than one of the following laser conditions are applied:

Power: preferably at least 10 W or 15 W, more preferably at least 20 W or 25 W; preferably at most 150 W or 130 W, more preferably at most 120 W or 100 W.

Focal diameter: 10 to 50 μm

Pulsed laser frequency: preferably at least 1 kHz or 5 KHz, more preferably at least 10 or 20 KHz; preferably at most 1000 kHz or 500 KHz, more preferably at most 100 or 80 KHz.

Mirror accuracy: 50 μm

Speed: 100 to 200 mm/sec, preferably around 150 mm/sec

These conditions may vary significantly according to the type of laser used and may also vary according to the material of the bearing component to be marked. Preferably, according to the present first embodiment, the laser is set to induce temperatures of between 200-500° C. at a depth of around 0.3-0.5 mm under the surface of the element to be marked.

The mark according to the invention is rendered visually undetectable with the naked eye by at least removing the oxide layer that forms on the surface. It is therefore advantageous to provide the mark prior to the step of face machining, since this obviates the need for an additional material removal process. With a typical grinding step, which may remove around 0.1 to 0.2 mm of material, zones A, B and C may be removed so that only zone D, the tempered zone, is exposed. This zone may then be easily revealed by etching its surface so as to be clearly read.

According to a second embodiment of the method of manufacturing a bearing component, an identification mark is provided after machining and washing of the bearing component. According to such a manufacturing process, only a polishing step may be necessary to remove the oxide layer and render the mark visually undetectable. As such a polishing step removes far less material than a grinding step, it may be necessary to originally create the mark until a depth of only around 0.15 to 0.25 mm. To create a tempered zone at such a depth, i.e. to induce temperatures of around 200-500° C. at such a depth, the mark generally includes only tempered zone D, and not the other zones A to C described hereinabove.

Advantageously the mark has a depth of at least 0.05 mm or at least 0.1 mm, more preferably at least 0.15 mm; preferably the mark has a depth not greater than 0.5 mm, 0.4 mm or more preferably not greater than 0.3 mm.

Suitably, a less intensive laser beam is used in the second embodiment, compared with the first embodiment. Beam intensity may be reduced, for example, by using a lower power setting, by increasing the focal diameter of the beam (i.e. de-focussing the beam), or by reducing the exposure time. Preferably, the laser is set to induce temperatures of between 200-500° C. to a depth of around 0.2 mm under the surface of the element to be marked. In a particularly preferred embodiment, the same laser that is used to provide the bearing component with the conventional, visible laser marking is used to provide the authentication mark according to the invention.

When it becomes necessary to detect whether the mark is present or not, or to examine or read it, the surface where the mark is supposed to be present is etched. In a preferred embodiment, the etching step is carried out by contacting the surface of the bearing component with an acid, for example a solution of nitric acid with alcohol. After a few seconds, the mark may then appear and become readable. The mark is read optically, preferably with the naked eye. Alternatively, a magnifying glass or an optical microscope may be necessary to correctly read the mark. In another embodiment, an optical reader, e.g. for reading bar-codes, may be used.

Etching the bearing component surface of a counterfeit product may reveal the absence of a mark that a genuine product would have had. Alternatively, when a mark is revealed it may be compared with stored data, e.g. a database maintained by the manufacturer of genuine bearing components, to verify its authenticity.

Embodiments of the invention will now be described, by way of example only, with reference to the accompanying drawings.

BRIEF DESCRIPTION OF THE DRAWINGS

FIG. 1 is a schematic plan view of a mark according to the invention in an initial state, showing four zones according to the temperatures the material has reached;

FIG. 2 is a schematic cross-section of the same mark;

FIG. 3 is a schematic cross-section of the same mark, rendered visually undetectable after a material removal step.

FIG. 4 is a schematic plan view of a symbol created using a laser beam.

DETAILED DESCRIPTION OF THE INVENTION

In one example, a bearing ring is provided with a visually undetectable mark according to the invention. A suitable method of manufacturing the bearing ring is as follows. First a ring blank is formed by pressing and turning; it is then soft machined by grinding. Next, the bearing ring is hardened: it is heated to a temperature within the range 750 to 900° C., then rapidly cooled (by means of quenching). After the step of hardening, a mark, comprising e.g. one or more symbols or a unique identification number, is created with a laser beam on an external side surface of the ring. The one or more symbols or identification number is entered into a manufacturer's database.

In an alternative embodiment of the method, the authentication mark is provided on the ring side face after the step of hardening.

FIGS. 1 and 2 show a mark with the four zones A, B, C, D, in its initial state, described hereinabove. The mark also comprises an oxide layer (not shown), which forms at the surface of the mark due to a chemical reaction with oxygen. The broad black arrow represents the laser beam and the dashed arrow shows the direction of progress. The mark modifies the steel of the ring to a depth of around 0.5 mm. The laser used may be a 20-watt q-switched fibre laser with a 160 mm focal length lens, which is set to a power of 18 W, a speed of 130 mm/s and a frequency of 35 kHz.

Whether provided before or after hardening, the mark is rendered visually undetectable with the naked eye by grinding, during a step of face machining. The oxide layer is removed and a portion of the bearing ring, approximately 0.2 mm of material, is also removed. In the present example, only tempered zone D remains exposed. FIG. 3 shows the mark of FIGS. 1 and 2 after such a treatment: a thickness h of material has been removed.

Next, a raceway is hard machined in the bearing ring by grinding; the raceway is honed and the ring is washed. Between the honing and washing steps, another mark may be added on the bearing ring, also by laser. This mark is then intended to remain visible. It may help to know where the hidden mark is present, if both are created side by side. In an advantageous embodiment, the visible mark is at least partially created on top of the hidden mark. Suitably, the two marks may overlap each other by a predetermined amount, such that counterfeiting becomes even more difficult.

When somebody wishes to verify if a bearing ring is a counterfeit or a genuine part, an etchant is applied to the surface of the ring where the mark is expected to be present. If the visible mark has been created on top of the hidden mark, it may be necessary to polish away at least part of the visible mark using e.g. an abrasive cloth. The etchant may be applied using e.g. an ear-bud, which is rubbed over the ring surface. After a few seconds' exposure, the mark is revealed and readable with the naked eye. The mark may then be compared to data stored in a manufacturer's confidential database, to check if the mark is authentic.

In a second embodiment of the invention, a finished bearing component is provided with a laser marking, the visible signs of which are then removed. Again with reference to a bearing ring, a blank is formed by pressing and turning; it is then soft machined by grinding; then the bearing ring is hardened. This is followed by a face machining step. Then a raceway is hard machined in the bearing ring by grinding; the raceway is honed and the ring is washed.

An identification mark, comprising e.g. a unique identification number, is then created with a laser beam on the external side surface of the ring. This identification number is entered into a manufacturer's database. The laser beam tempers the steel of the ring to a depth of around 0.2 mm. The heat of the laser beam and the presence of oxygen also creates an oxide layer of a few microns thick on the surface of the mark. In a final step, the mark is rendered visually undetectable with the naked eye by polishing, in order to remove the oxide layer.

When somebody wishes to verify if a bearing ring is a counterfeit or a genuine part, the surface of the ring where the mark is expected to be present is etched. The information within the revealed mark may then be compared to data stored in a manufacturer's confidential database, to verify authenticity.

A suitable etchant for revealing the authentication mark made on a bearing component is Nital, which is a solution of nitric acid in ethanol. A 2% solution is commonly used. For components made of stainless steel, Vilella's Reagent may be employed, which is a solution of picric acid and hydrochloric acid in ethanol. Other etchants such as Picral and Glyceregia may also be used according to the steel grade from which the bearing component is made.

The mark provided on a bearing component in accordance with the invention may be a character string comprising symbols and/or numerals and/or alphabetic letters etc. The mark may also be an encryption, such as a barcode. In a further embodiment, the mark comprises at least one symbol that contains an embedded encryption. In other words, in addition to the information conveyed by the symbol itself, the symbol comprises encrypted information that must be decrypted to extract the underlying data.

It has been found that after etching of a visually undetectable laser marking which comprises one or more symbols having at least one continuous line, it is possible to discern the start location and the stop location of each continuous line. This is because segments of the continuous line which have received relatively more energy from the laser beam are discernible from segments which have received relatively less energy. For example, "overlaps" are discernible. The term overlap is used to refer to a line segment where the laser beam continues the line partially on top of an already-formed segment. This can be clearly seen in FIG. 1, which shows an example of a symbol after it has been created using a laser beam.

In this example, the mark consists of the letter K and comprises five continuous lines: a first line 1, a second line 2, a third line 3, a fourth line 4, and a fifth line 5. The laser used imparts energy in pulses, and each line therefore comprises a sequence of overlapping individual segments, which are indicated by circles in FIG. 1. With reference to the first line 1, it can be seen that the line was started at a start location 20 and was stopped at a stop location 30, since the stop location 30 consists of a "circle" that lies on top of the previous circle. Consequently, it is possible to determine that each line 1, 2, 3, 4, 5 was created in the direction indicated by the corresponding arrow, and that the lines were created in sequential order starting with the first line 1 and finishing with the fifth line 5. This information remains discernible by etching after the visible traces of the symbol have been mechanically removed.

When the laser beam reaches the end of the first line 1, the laser beam is deactivated and is then reactivated when the beam is at point approximately midway along line 1, in order to create the second line 2. At this point where the first and second lines 1, 2 intersect, the bearing steel has been subjected to a more intensive heat treatment than non-intersecting parts on the two lines. The result, again, is a discernible change in microstructure that is revealable by etching as described previously. Thus, in one embodiment of the invention, the step of laser marking mark comprises using predetermined start and stop locations of the laser beam to form each continuous line of the one or more symbols which make up the identification mark. In this way, an encryption is embedded within an already hidden code. The encrypted information may comprise the start/stop location of one particular line. Preferably, the encrypted information comprises the start/stop location of each continuous line.

At the end of the second line 2, the beam must change direction in order to create the third line 3. At the point where the beam changes direction, the beam stays in one place for a relatively longer time than if the beam is moving, meaning that this point receives more energy than neighbouring points. The resulting microstructural differences in the bearing steel are again revealable by means of etching. Consequently, the use of predetermined start/stop locations of the laser beam is not limited to the end points of each continuous line. The laser may be programmed such that the laser beam is deactivated at a predetermined location along the line, then reactivated at the same location to complete the line. Alternatively, the laser may be programmed to linger at the predetermined location, such that relatively more energy is imparted to the bearing steel at that location. Such locations may also form part of the encrypted information.

In a further development, a predetermined sequence is used to form each continuous line when the symbol comprises two or more intersecting continuous lines. Suitably, the sequence used then forms part of the encrypted information. Thus, the start/stop locations of the laser beam and the sequence used to create each symbol may be varied according to e.g. manufacturing site and/or manufacturing date and/or product type etc. Such an additional layer of encoding provides an even further protection against unauthorized copying A number of aspects/embodiments of the invention have been described. It is to be understood that each aspect/embodiment may be combined with any other aspect/embodiment. The invention may thus be varied within the scope of the accompanying patent claims.

The invention claimed is:

1. A method for providing an identification mark on a bearing component made from a bearing steel, comprising:
   hardening the bearing component,
   applying a laser beam to a surface of the bearing component so as to raise a temperature of a portion of the surface to at least 1500° C. and so as to raise a temperature of a depth of at least 0.3 mm below the surface to between 200-500° C., wherein an oxidised surface layer, which is visible with the naked eye, forms on the surface and an altered microstructure comprising a tempered zone forms below the surface, and
   exposing the altered microstructure comprising the tempered zone by grinding or polishing about 0.1 to 0.2 mm of material from the oxidised surface layer of the identification mark, such that the identification mark is rendered visually undetectable with the naked eye.

2. The method according to claim 1, wherein the step of applying the laser beam is performed after the step of hardening.

3. The method according to claim 1, wherein the step of applying the laser beam is performed prior to the step of hardening.

4. The method according to claim 1, wherein the bearing component is a bearing ring, and
   the step of applying the laser beam further comprises providing the identification mark on a side face of the bearing ring, and wherein
   the step of exposing the altered microstructure comprising the tempered zone coincides with a face machining operation performed on the bearing ring after the hardening step.

5. The method according to claim 1, wherein the step of applying the laser beam and exposing the altered microstructure comprising the tempered zone are performed as a part of a finishing operation, prior to assembly of the bearing component in a bearing.

6. The method according to claim 1, wherein the step of applying the laser beam further comprises encrypting information within the identification mark.

7. The method according to claim 6, wherein the identification mark further comprises one or more symbols having at least one continuous line and the step of applying the laser beam further comprises using predetermined start and stop locations of the laser beam to form each continuous line.

8. The method according to claim 7, wherein the identification mark further comprises one or more symbols having two or more intersecting continuous lines and the step of applying the laser beam further comprises using a predetermined sequence to form each intersecting continuous line.

9. The method according to claim 1, wherein the method further comprises applying a second laser beam to the surface of the bearing component, wherein a visual identification mark generated by the second laser beam is not removed in the step of exposing the altered microstructure comprising the tempered zone and remains visible after the bearing component is assembled in a bearing.

10. The method according to claim 9, wherein the visual identification mark is provided at least partially on top of the identification mark, which is visually undetectable with the naked eye.

11. The method according to claim 9, wherein the visual identification mark and the identification mark, which is visually undetectable with the naked eye, are generated using the same laser.

12. The method according to claim 8, wherein the laser beam imparts energy in pulses, and each line comprises a sequence of overlapping individual segments.

13. The method according to claim 12, further comprising:
applying a second laser beam to the surface of the bearing component,
wherein:
a visual identification mark generated by the second laser beam remains visible after the bearing component is assembled in a bearing,
the visual identification mark is provided at least partially on top of the identification mark, which is visually undetectable with the naked eye, and
the visual identification mark and the identification mark, which is visually undetectable with the naked eye, are generated using the same laser.

* * * * *